UNITED STATES PATENT OFFICE.

WILLIAM MALLERD, OF PROVIDENCE, RHODE ISLAND.

IMPROVEMENT IN SIZING COMPOUNDS FOR WARPS OR YARNS.

Specification forming part of Letters Patent No. 7,511, dated July 16, 1850.

*To all whom it may concern:*

Be it known that I, WILLIAM MALLERD, now or late of Providence, in the county of Providence and State of Rhode Island, have invented a new and Improved Chemical Compound, to be combined with potato-starch or other like substance when used in dressing or sizing warps or yarns, of which the following is a specification.

It has been customary in England to use in wheat-flour starch a composition of resin and soda or potash; but the component parts of this mixture are very liable to separate when it is suffered to stand still for a short period of time, the resin being precipitated in the alkaline solution. The object of such a composition of resin and alkali is the neutralization of certain acid contained in the flour, or which may be generated therein by the process of fermentation. Size, when made from the flour and the resinous and alkaline composition, is used while in a heated state, about one gallon of the composition being the amount usually incorporated with two hundred pounds of flour.

In England the process of sizing warps is by what is usually termed "padding," or saturating them with the flour-size by causing them to pass in a body through a vat of size, and afterward squeezing out the superfluous size by means of squeeze-rollers. Size so prepared has been tried in this country on warp-sizing frames, or what are commonly called "dressing-frames;" but as such flour-size is very apt to undergo the process of fermentation, it is not practicable to employ it to good advantage. When combined with potato or wheat-flour starch, although the acids may be neutralized to a greater or less degree, the separation of the resin is often so great as to cause the squeeze-rollers to be covered by it to such extent as to greatly retard or injuriously affect their operation.

My improved composition, to be used in connection with potato-starch or other like sizing-matter, gives great strength or body to the same. Starch mixes with warm or cold water readily, and is not likely, when combined with a due quantity of my improved composition, to run down, as will be understood by the dressers or operatives. Besides this, it will size the warps very uniformly, and consequently adds much to their strength, the warp, when dressed with it, not being liable to break so often as it would when dressed with the mixtures generally used. Neither are warp-yarns dressed with the improved size so liable to chafe in the loom while being woven, the cloth being very materially improved when made of such yarn.

In the manufacture of my improved composition I put one hundred pounds of resin, or thereabout, in an iron kettle or boiler in which one hundred gallons of water has been introduced and brought to a heated or boiling state, the boiling of the liquid being afterward kept up from four to six hours, or a sufficient time to separate the impurities, volatile and foreign matters in the resin, which it may be desirable to remove therefrom, and which may be skimmed or taken off in any proper way. We next add about thirty pounds of carbonate of soda or potash and continue the boiling six or eight hours longer, or until the resin ceases to be stringy. Next add one and one-half pound of tallow, three-quarters of a pound of some vegetable oil, and one-half a pound of caoutchouc or india-rubber, they being previously melted together by heat. The mixture is next to be suffered to boil for about two hours longer. Water is next to be added to the whole until the mixture is raised to about sixty-five gallons, when it may be boiled about one hour longer. When cold two quarts of alcohol should be mixed with it. In general about one gallon of the improved composition may be used with one hundred pounds of potato-starch or other analogous sizing material. It is to be incorporated while the starchy size is in either a boiling or sufficiently heated state. The proportionate quantity of the composition will vary, however, with the fineness of the yarn, this being a matter to be regulated by the experience of the dressers.

With respect to the composition such as has heretofore been used, and composed of resin and alkali alone, the two ingredients are liable to separate when the mixture becomes cold. For the purpose of preventing this I mix with them a substance which has an affinity for each. A vegetable oil or an animal fat may be used; but a composition of tallow, vegetable oil, and gum-caoutchouc is found to be the best, for if tallow alone were used the mixture would be too stiff and hard for use. If vegetable oil alone were employed, the mixture would, generally speaking, be too soft. So, if the tallow and oil be combined in the right proportions, there is yet wanting what is usually termed the "proper degree of elasticity" in the compound. This elasticity is given to it by the addition of gum-caoutchouc or some other like material. The alcohol combines the whole together and facilitates the drying of the size when applied to the warps.

I lay no claim to a combination of starchy matters and resinated alkalies alone; but my invention and what I claim consists—

1. In the combination of the same and the composition of animal tallow, oil, and caoutchouc, in or about in the proportions specified, and for the purpose described.

2. The combination of alcohol with the composition of resinous, alkaline, and other matters, as specified, and for the purpose as above stated.

In testimony whereof I have hereto set my signature this 2d day of March, A. D. 1850.

WILLIAM MALLERD.

Witnesses:
  R. H. EDDY,
  F. GOULD.